(12) United States Patent
Yang

(10) Patent No.: US 10,598,869 B2
(45) Date of Patent: Mar. 24, 2020

(54) OPTICAL FIBER CONNECTOR ASSEMBLY AND CONNECTING SYSTEM

(71) Applicant: LOTES CO., LTD, Keelung (TW)

(72) Inventor: Qi Xiao Yang, Keelung (TW)

(73) Assignee: LOTES CO., LTD, Keelung (TW)

( * ) Notice: Subject to any disclaimer, the term of this patent is extended or adjusted under 35 U.S.C. 154(b) by 25 days.

(21) Appl. No.: 16/158,717

(22) Filed: Oct. 12, 2018

(65) Prior Publication Data

US 2019/0113692 A1 Apr. 18, 2019

(30) Foreign Application Priority Data

Oct. 13, 2017 (CN) .................... 2017 2 1321227 U

(51) Int. Cl.
G02B 6/38 (2006.01)

(52) U.S. Cl.
CPC ......... *G02B 6/3881* (2013.01); *G02B 6/3817* (2013.01); *G02B 6/3879* (2013.01); *G02B 6/3883* (2013.01); *G02B 6/3821* (2013.01); *G02B 6/3885* (2013.01)

(58) Field of Classification Search
CPC .. G02B 6/3887; G02B 6/3821; G02B 6/3893; G02B 6/3869; G02B 6/387; G02B 6/3871; G02B 6/3873; G02B 6/3881
See application file for complete search history.

(56) References Cited

U.S. PATENT DOCUMENTS 9,500,812 B2 11/2016 Tanaka et al.
2017/0010422 A1 1/2017 Childers et al.

FOREIGN PATENT DOCUMENTS

CN 105556357 A 5/2016
TW I596836 B 8/2017

*Primary Examiner* — Thomas A Hollweg
*Assistant Examiner* — Mary A El-Shammaa
(74) *Attorney, Agent, or Firm* — Locke Lord LLP; Tim Tingkang Xia, Esq.

(57) ABSTRACT

An optical fiber connector assembly and a connecting system are disclosed. The optical fiber connector assembly includes a first accommodating groove and a second accommodating groove concavely provided in sequence backward from a front end surface of the sliding seat and intercommunicated with each other. A width of the second accommodating groove is less than a width of the first accommodating groove. A step surface is provided between the first accommodating groove and the second accommodating groove. An optical fiber connector is mounted on the sliding seat and floatable with respect to the fixing seat along a front-rear direction, a left-right direction and a vertical direction. A mating section of the optical fiber connector is located in the first accommodating groove. A connecting section is partially accommodated in the second accommodating groove. The step surface is located behind the mating section to stop the mating section from moving backward.

13 Claims, 12 Drawing Sheets

A-A

OPTICAL FIBER CONNECTOR ASSEMBLY AND CONNECTING SYSTEM

CROSS-REFERENCE TO RELATED PATENT APPLICATION

This non-provisional application claims priority to and the benefit of, pursuant to 35 U.S.C. § 119(a), patent application Serial No. CN201721321227.1 filed in China on Oct. 13, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an optical fiber connector assembly and a connecting system, and in particular, to an optical fiber connector assembly having a floating function, and a connecting system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An optical fiber connector assembly common in the industry is used for mating with a mating optical fiber connector. The optical fiber connector assembly includes a fixing seat and an optical fiber connector mounted on the fixing seat. The optical fiber connector includes an insulating seat and multiple optical fibers accommodated in the insulating seat. Front ends of the optical fibers are exposed on a front end of the insulating seat. The insulating seat has a mating section at a front side and a connecting section at a rear side. The connecting section is used for connecting the mating section and a cable section. The fixing seat is concavely provided with an accommodating groove. The mating section is fixed in the accommodating groove, and the connecting section is located outside the accommodating groove. However, the connecting section is not supported or limited by the fixing seat, resulting in a joint between the connecting section and the mating section to be easily broken, and thus affecting the structural stability of the optical fiber connector. Moreover, when the optical fiber connector and the mating optical fiber connector are mated with each other, the optical fiber connector is fixedly provided on the fixing seat, so the optical fiber connector may easily collide during mating. Further, the optical fiber connector is prone to moving backward when being abutted by the mating optical fiber connector, thereby resulting in a bad contact and affecting transmission of the optical signals.

Therefore, a heretofore unaddressed need to design a novel optical fiber connector assembly and a connecting system exists in the art to address the aforementioned deficiencies and inadequacies.

SUMMARY

The present invention is directed to an optical fiber connector assembly and a connecting system thereof, where a sliding seat is provided on a fixing seat, such that a mating section of an optical fiber connector is located in a first accommodating groove and a connecting section is located in a second accommodating groove, thereby achieving float mating of the optical fiber connector and simultaneously improving the structural stability of the optical fiber connector, and allowing the optical fiber connector and a mating optical fiber connector to be in good contact.

To achieve the foregoing objective, the present invention adopts the following technical solutions.

In one aspect, the present invention provides an optical fiber connector assembly, including: a fixing seat; a sliding seat, movably mounted on the fixing seat, wherein a first accommodating groove and a second accommodating groove are concavely provided in sequence backward from a front end surface of the sliding seat and are intercommunicated with each other, a width of the second accommodating groove is less than a width of the first accommodating groove, and a step surface is provided between the first accommodating groove and the second accommodating groove; and an optical fiber connector, mounted on the sliding seat and floatable with respect to the fixing seat along a front-rear direction, a left-right direction and a vertical direction, the optical fiber connector comprising an insulating seat having a mating section and a connecting section connected to a rear end of the mating section, and a plurality of optical fibers being received in the mating section and extending to the connecting section, a front end of each of the optical fibers being exposed on a front end of the mating section, wherein the mating section is located in the first accommodating groove, the connecting section is partially accommodated in the second accommodating groove, and the step surface is located behind the mating section to stop the mating section from moving backward.

In certain embodiments, gaps exist between the sliding seat and the fixing seat in the front-rear direction, the left-right direction and the vertical direction, such that the sliding seat is floatable with respect to the fixing seat, and the optical fiber connector is fixedly mounted on the sliding seat.

In certain embodiments, the fixing seat is provided with at least one first elastic member and at least one second elastic member, the first elastic member elastically abuts the sliding seat along the front-rear direction, and the second elastic member elastically abuts the sliding seat along the vertical direction.

In certain embodiments, the fixing seat are provided with two side walls respectively at a left side and a right side of the fixing seat, and a rear stop wall connecting the two side walls, the two side walls and the rear stop wall jointly define an accommodating space configured to accommodate the sliding seat, the rear stop wall is provided with at least one first protruding post protruding forward, the sliding seat is provided with a second protruding post protruding backward and opposite to the first protruding post, one end of the first elastic member is fixed to the first protruding post, and the other end of the first elastic member is fixed to the second protruding post.

In certain embodiments, a front end of the fixing seat is further provided with a U-shaped groove concavely provided downward on an inner wall surface of the accommodating space, a supporting member is fixedly mounted in the U-shaped groove, the sliding seat is partially located above the supporting member, and the supporting member supports the sliding seat upward.

In certain embodiments, the fixing seat is provided with at least one third protruding post protruding in the accommodating space along the vertical direction, one end of the second elastic member is sleeved over the third protruding post, and the other end of the second elastic member abuts a bottom surface of the sliding seat.

In certain embodiments, a left side and a right side of the sliding seat are respectively provided with two posts, a left side and a right side of the insulating seat are respectively provided with two guide portions, and a front end of each of the posts is located behind a front end of a corresponding one of the guide portions.

In certain embodiments, one side of the fixing seat is provided with a through hole running therethrough along the front-rear direction, the other side of the fixing seat is provided with a latch member, a pivot is fixedly provided and inserted in the through hole and has two ends protruding out of the through hole, one side of a cover plate is provided with two pivoting holes pivotally connected to the two ends of the pivot, and the other side of the cover plate is provided with a buckling portion latched with the latch member.

In certain embodiments, the other side of the fixing seat is concavely provided with a slot, the slot is protrudingly provided with a stopping portion, the latch member is movably mounted in the slot, one side of the latch member is provided with a hook portion entering the slot, the stopping portion is located at an outer side of the hook portion to prevent the hook portion from being separated from the slot, and the other side of the latch member is protrudingly provided with a latch block toward a direction away from the hook portion and latched with the buckling portion.

In certain embodiments, one side of the latch member is protrudingly provided with a first protruding portion, the inner wall surface of the slot is integrally and protrudingly provided with a second protruding portion opposite to the first protruding portion, one end of a spring is sleeved over the first protruding portion, the other end of the spring is sleeved over the second protruding portion, and when the cover plate covers the fixing seat, the latch member compresses the spring and moves into the slot, such that the latch block is buckled to the buckling portion.

In certain embodiments, the fixing seat is mounted on a first circuit board, the fixing seat is concavely provided with at least one retaining groove, one end of at least one metal member is retained in the retaining groove, and the other end of the at least one metal member is soldered to the first circuit board.

In certain embodiments, each of two sides of the mating section is protrudingly provided with a position limiting block along the left-right direction, and each of left and right sides of the first accommodating groove is provided with a stopping surface correspondingly located in front of the position limiting block and configured to stop the position limiting block from moving forward.

In certain embodiments, a width of the connecting section along the left-right direction is less than a width of the mating section along the left-right direction, and a length of the connecting section along the front-rear direction is greater than a length of the mating section along the front-rear direction.

In another aspect, the present invention further provides a connecting system, including: an optical fiber connector assembly, including: a fixing seat; a sliding seat movably mounted on the fixing seat, wherein a first accommodating groove and a second accommodating groove are concavely provided in sequence backward from a front end surface of the sliding seat and are intercommunicated with each other, a width of the second accommodating groove is less than a width of the first accommodating groove, and a step surface is provided between the first accommodating groove and the second accommodating groove; and an optical fiber connector, including a mating section and a connecting section connected to the mating section, wherein the mating section is located in the first accommodating groove, the step surface is located behind the mating section, the connecting section is partially accommodated in the second accommodating groove, the optical fiber connector is floatable with respect to the fixing seat along a front-rear direction, a left-right direction and a vertical direction, and a left side and a right side of the optical fiber connector are respectively provided with two guide portions; and a mating optical fiber connector assembly, including a base and a mating optical fiber connector fixedly mounted on the base, wherein a left side and a right side of the mating optical fiber connector are respectively provided with two adaptation portions, and the two guide portions match with the two adaptation portions respectively to guide the optical fiber connector to be in contact with the mating optical fiber connector.

In certain embodiments, gaps exist between the sliding seat and the fixing seat in the front-rear direction, the left-right direction and the vertical direction, such that the sliding seat is floatable with respect to the fixing seat, and the optical fiber connector is fixedly mounted on the sliding seat.

In certain embodiments, the fixing seat is provided with at least one first elastic member and at least one second elastic member, the first elastic member elastically abuts the sliding seat along the front-rear direction, and the second elastic member elastically abuts the sliding seat along the vertical direction.

In certain embodiments, the fixing seat is fixedly mounted on a first circuit board, the first circuit board is further provided with an electrical connector located at one side of the fixing seat, the electrical connector is protrudingly provided with a first guide mechanism along the front-rear direction, the first guide mechanism has a first guide section and a second guide section extending backward from the first guide section, the base is fixedly mounted on a second circuit board, the second circuit board is further provided with a mating electrical connector located on one side of the base, the mating electrical connector is concavely provided with a first matching area along the front-rear direction to match with the first guide mechanism, the first matching area has a first matching section and a second matching section extending backward from the first matching section, and when the first guide section penetrates through the first matching section and enters the second matching section, the guide portions start to enter the adaptation portions.

In certain embodiments, a left side and a right side of the sliding seat are respectively provided with two second guide mechanisms, each of the second guide mechanisms has a third guide section and a fourth guide section extending backward from the third guide section, the third guide section is located in front of a corresponding one of the guide portions, the base is provided with a second matching area, the second matching area has a third matching section and a fourth matching section extending backward from the third matching section, and when the first guide section penetrates through the first matching section and enters the second matching section and the third guide section penetrates through the third matching section and enters the fourth matching section, the guide portions start to enter the adaptation portions.

In certain embodiments, the third guide section is provided with chamfers at two sides along the left-right direction, the third matching section has a width gradually becoming narrow from front to rear, and a width of the fourth matching section is less than or equal to a minimum width of the third matching section.

In certain embodiments, the optical fiber connector comprises an insulating seat, the insulating seat has a plurality of optical fibers being exposed on a front end of the mating section and extending to the connecting section, each of two sides of the insulating seat is protrudingly provided with a position limiting block along the left-right direction, and each of left and right sides of the first accommodating groove is provided with a stopping surface correspondingly located in front of the position limiting block.

Compared with the related art, the optical fiber connector assembly according to certain embodiments of the present invention has the beneficial effects that: the optical fiber connector is mounted on the sliding seat and is floatable with respect to the fixing seat along the front-rear direction, the left-right direction and the vertical direction, such that the optical fiber connector has an appropriate floating gaps in all directions. When the optical fiber connector and the mating optical fiber connector are mated with each other, to prevent the optical fiber connector from collision, the mating section is located in the first accommodating groove, and the connecting section is partially accommodated in the second accommodating groove. That is, the sliding seat supports and limits the position of the mating section and the connecting section simultaneously, thus effectively avoiding a joint between the connecting section and the mating section from being easily broken, and improving the structural stability of the optical fiber connector. Further, the step surface is located behind the mating section to stop the mating section from moving backward, such that the optical fiber connector and the mating optical fiber connector are in good contact, ensuring transmission of the optical signals, and preventing the optical fiber connector from being separated from the sliding seat.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
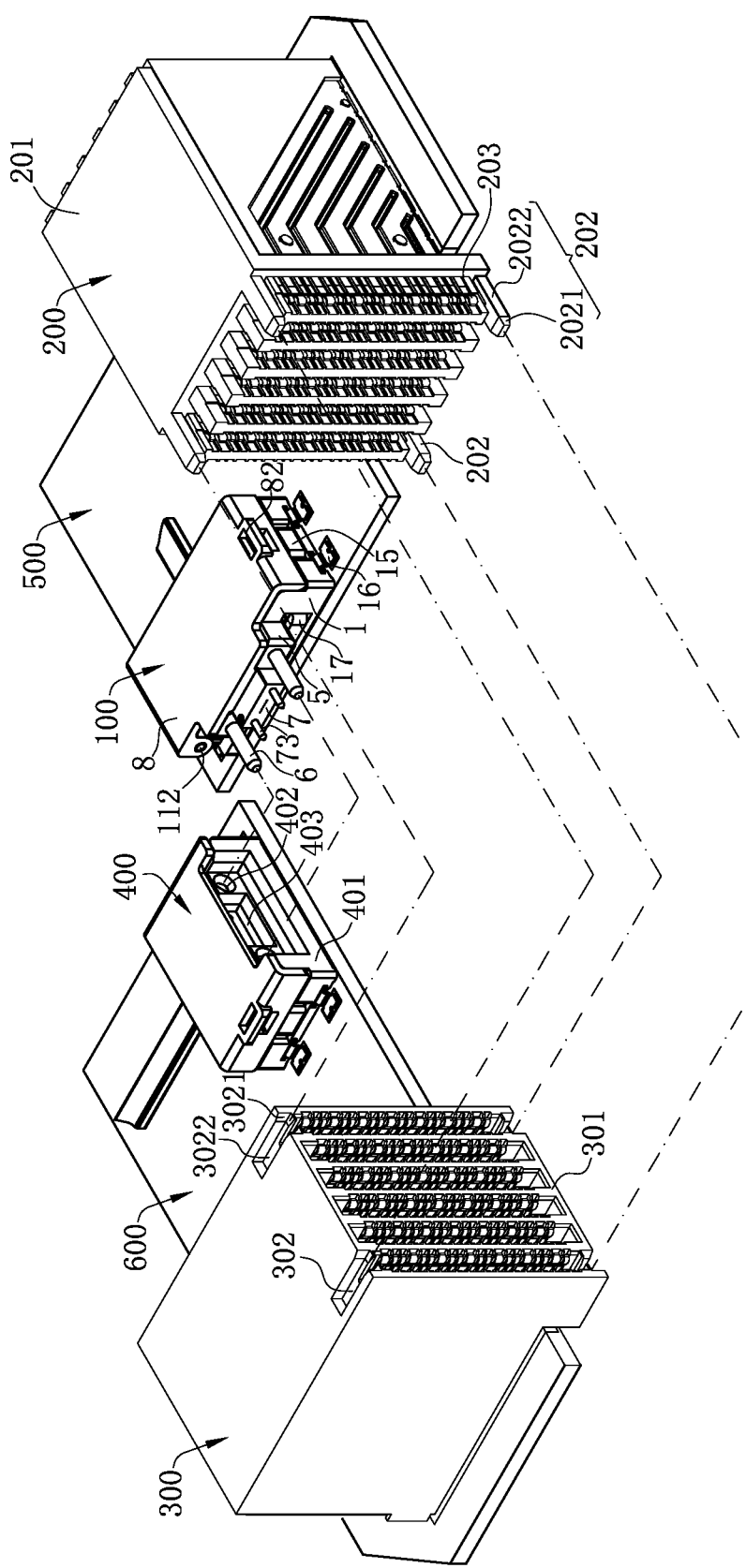
FIG. 1 is a schematic structural view of a connecting system according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper,"

depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-12. In accordance with the purposes of this invention, as embodied and broadly described herein, this invention, in one aspect, relates to an optical fiber connector assembly and a connecting system.

Figure 9:
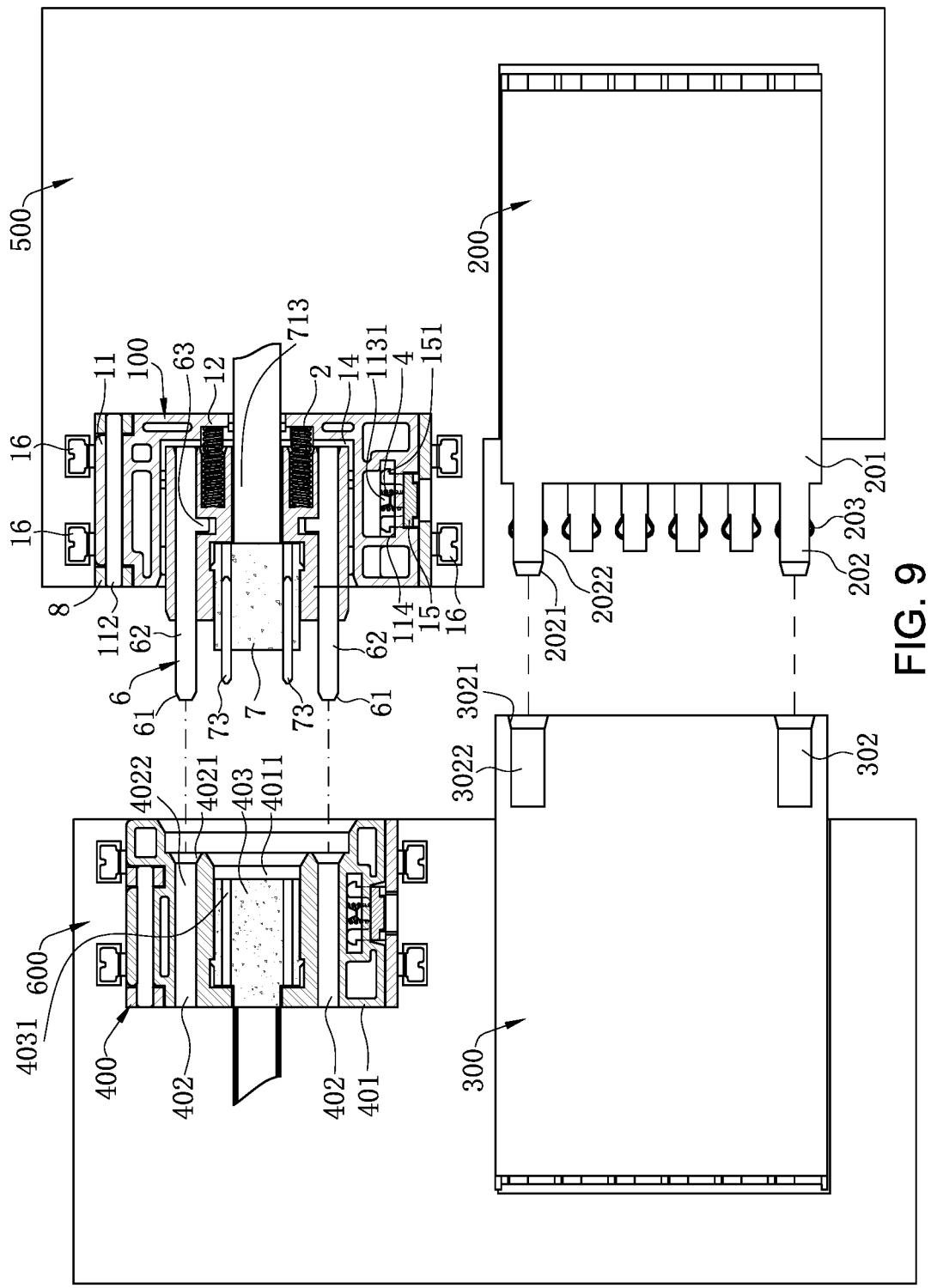
FIG. 9 is a sectional view of an electrical connector and an optical fiber connector assembly respectively not mated with a mating electrical connector and a mating optical fiber connector assembly according to certain embodiments of the present invention.
Figure 12:
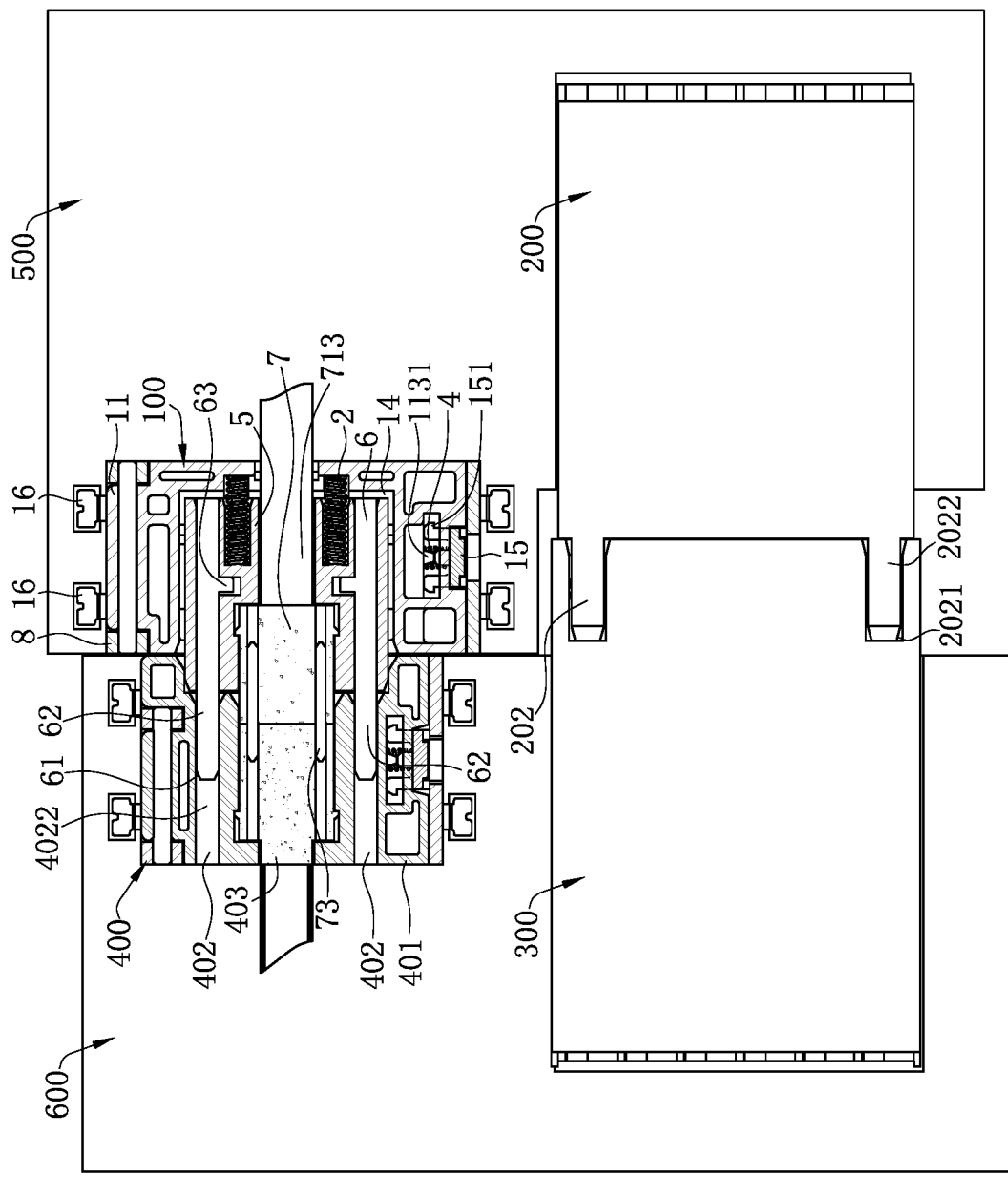
FIG. 12 is a schematic view of the electrical connector and the optical fiber connector assembly in FIG. 9 respectively completely mated with the mating electrical connector and the mating optical fiber connector assembly.

Referring to FIG. 1, FIG. 9 and FIG. 12, a connecting system according to certain embodiments of the present invention includes a first circuit board 500, which is further provided with an optical fiber connector assembly 100 and an electrical connector 200; and a second circuit board 600, which is further provided with a mating optical fiber connector assembly 400 and a mating electrical connector 300. The optical fiber connector assembly 100 includes a fixing seat 1 fixedly mounted on the first circuit board 500, a sliding seat 5 movably mounted on the fixing seat 1, and an optical fiber connector 7 mounted on the sliding seat 5. The optical fiber connector 7 is floatable with respect to the fixing seat 1 along a front-rear direction, a left-right direction and an vertical direction. Specifically, by the optical fiber connector 7 being "floatable," the optical fiber connector 7 can move for a small distance with respect to the fixing seat 1 in any of the front-rear direction, the left-right direction and the vertical direction. In the present embodiment, the optical fiber connector 7 is fixedly mounted on the sliding seat 5, and gaps are formed between the sliding seat 5 and the fixing seat 1 in the front-rear direction, the left-right direction and the vertical direction respectively, so that the sliding seat 5 is floatable with respect to the fixing seat 1. Thus, the optical fiber connector 7 can float along with the sliding seat 5 to adjust the position of the optical fiber connector assembly 100 conveniently, thereby allowing the optical fiber connector assembly 100 to be accurately inserted in the mating optical fiber connector assembly 400. In other embodiments, the optical fiber connector 7 can also be movably provided on the sliding seat 5. A left side and a right side of the optical fiber connector 7 are respectively provided with two guide portions 73. The mating optical fiber connector assembly 400 includes a base 401, which is fixedly mounted on the second circuit board 600. The mating optical fiber connector 403 is fixedly mounted on the base 401. A left side and a right side of the mating optical fiber connector 403 are respectively provided with two adaptation portions 4031. The two adaptation portions 4031 matches with the two guide portions 73 respectively to guide the optical fiber connector 7 to be in contact with the mating optical fiber connector 400. The electrical connector 200 is located at one side of the fixing seat 1. The mating electrical connector 300 is located at one side of the base 401. When the mating optical fiber connector assembly 400 is mated with the optical fiber connector assembly 100, the mating electrical connector 300 is mated with the electrical connector 200, so as to constitute the connecting system.

Figure 2:
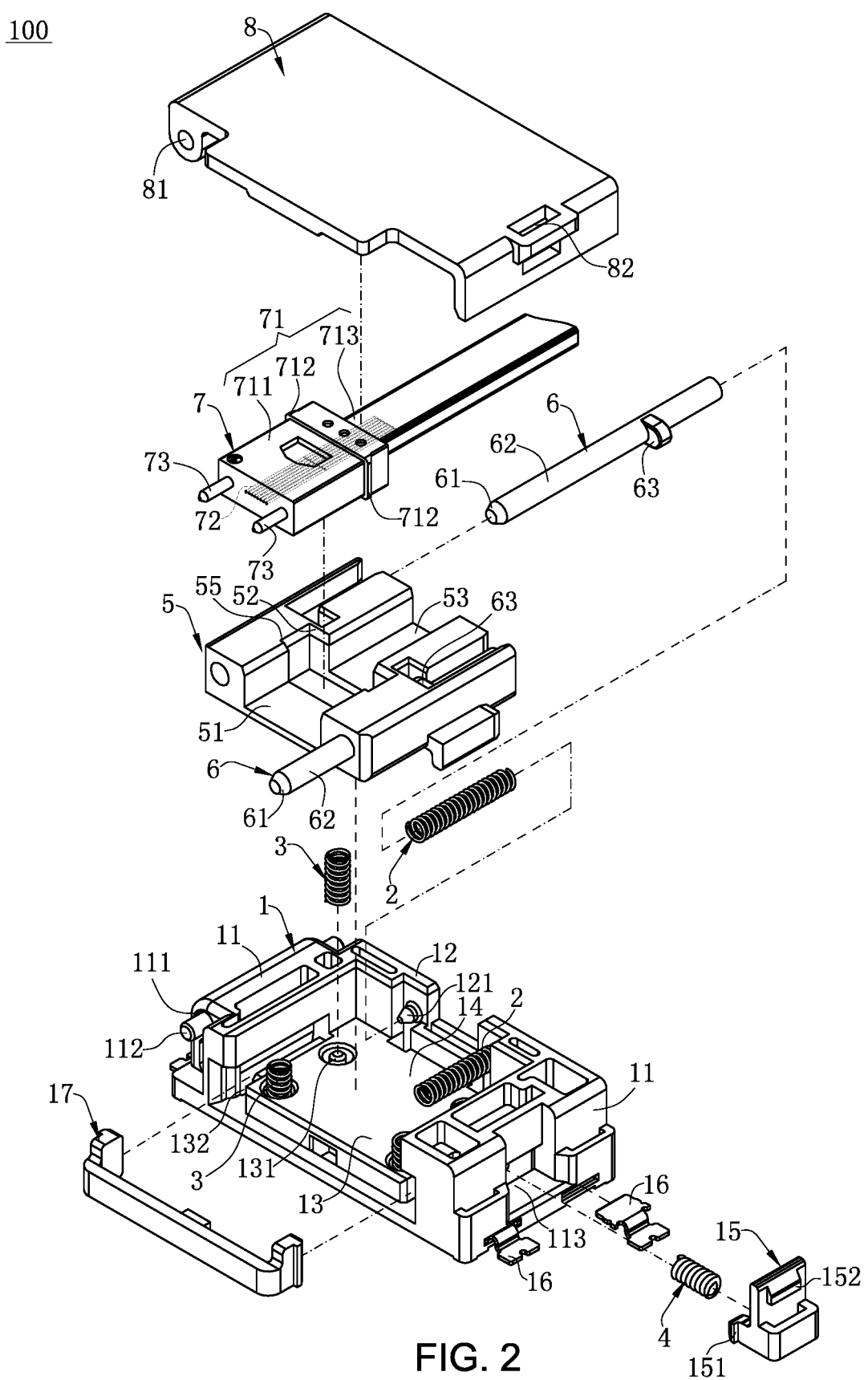
FIG. 2 is a perspective exploded view of an optical fiber connector assembly according to certain embodiments of the present invention.
Figure 3:
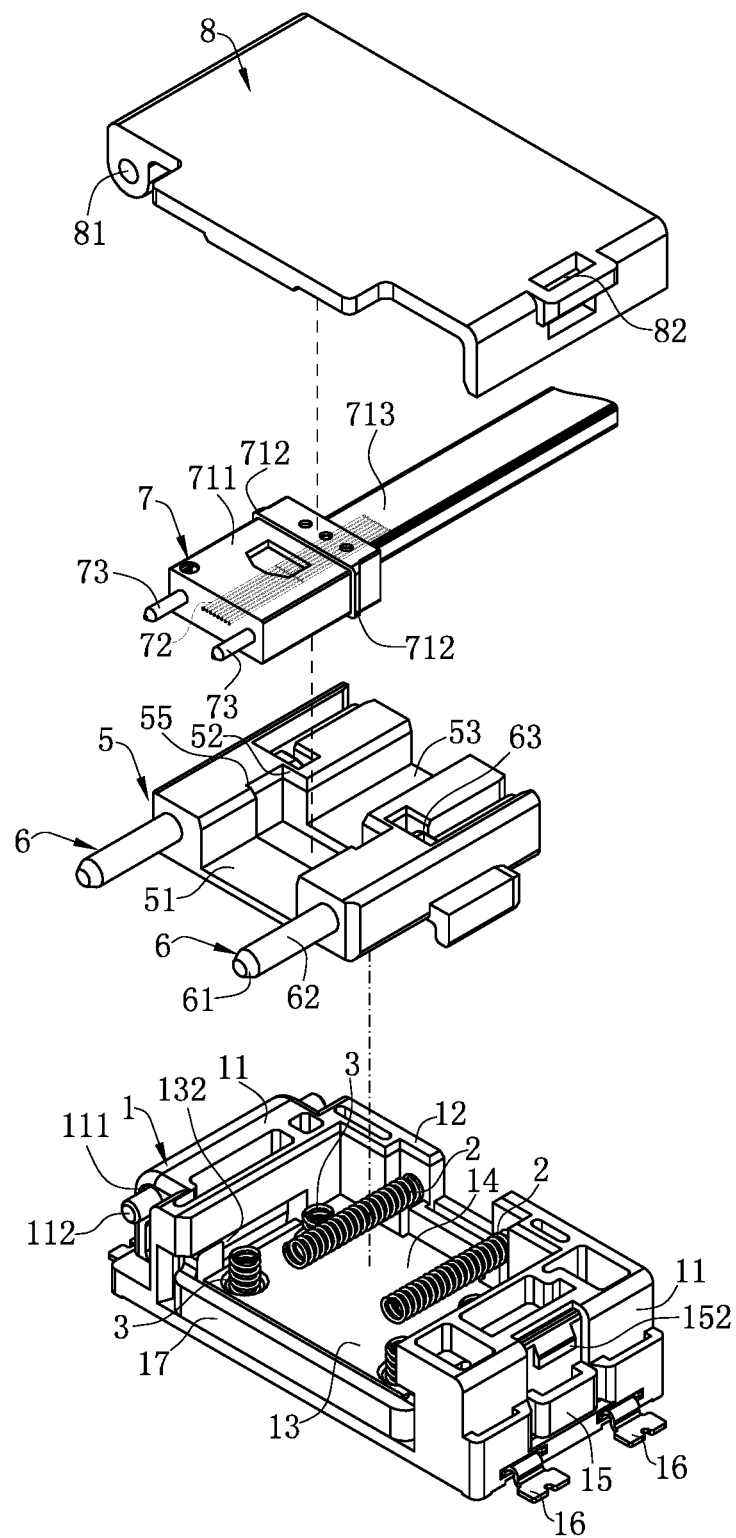
FIG. 3 is a partial assembled view of an optical fiber connector assembly according to certain embodiments of the present invention.
Figure 4:
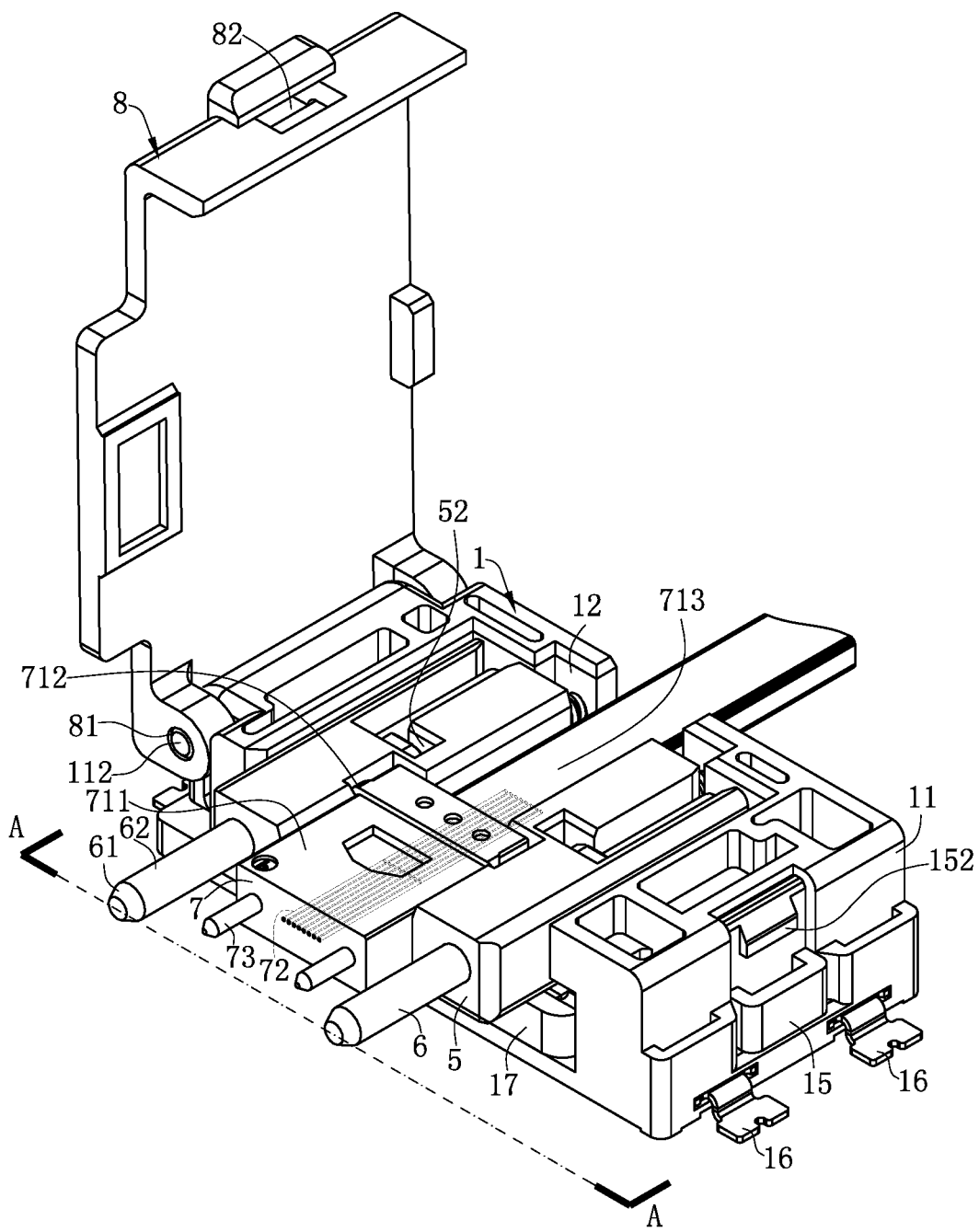
FIG. 4 is an assembled view of an optical fiber connector assembly according to certain embodiments of the present invention.

Referring to FIG. 2, FIG. 3 and FIG. 4, in the embodiment, the optical fiber connector 7 is fixedly mounted on the sliding seat 5, and gaps exist between the sliding seat 5 and the fixing seat 1 in the front-rear direction, the left-right direction and the vertical direction, such that the optical fiber connector 7 is floatable with the sliding seat 5, thus facilitating position adjustment of the optical fiber connector assembly 100, and enabling the optical fiber connector assembly 100 to be more accurately inserted into the mating optical fiber connector assembly 400. The fixing seat 1 is provided with at least one first elastic member 2 and at least one second elastic member 3. In the embodiment, there are two first elastic members 2 and four second elastic members 3. The first elastic members 2 elastically abut the sliding seat 5 along the front-rear direction, and the second elastic members 3 elastically abut the sliding seat 5 along the vertical direction. The fixing seat 1 is provided with two side walls 11 at a left side and a right side thereof, and a rear stop wall 12 and a bottom plate 13 connecting the two side walls 11. The two side walls 11, the rear stop wall 12 and the bottom plate 13 jointly define an accommodating space 14 for accommodating the sliding seat 5. The rear stop wall 12 is provided with at least one first protruding post 121 protruding forward, and the sliding seat 5 is provided with a second protruding post 54 protruding backward to be opposite to the first protruding post 121. One end of the first elastic member 2 is fixed to the first protruding post 121, and the other end of the first elastic member 2 is fixed to the second protruding post 54 to limit the position of the first elastic member 2. A front end of the bottom plate 13 of the fixing seat 1 is further concavely provided with a U-shaped groove 132. A supporting member 17 is fixedly mounted in the U-shaped groove 132. A front end of the sliding seat 5 is located above the supporting member 17, and the sliding seat 5 is supported upward by the supporting member 17, so as to avoid the front end of the sliding seat 5 from sinking and affecting the flatness of the sliding seat 5, and thereby affecting the mating effect of the optical fiber connector 7.

Figure 5:
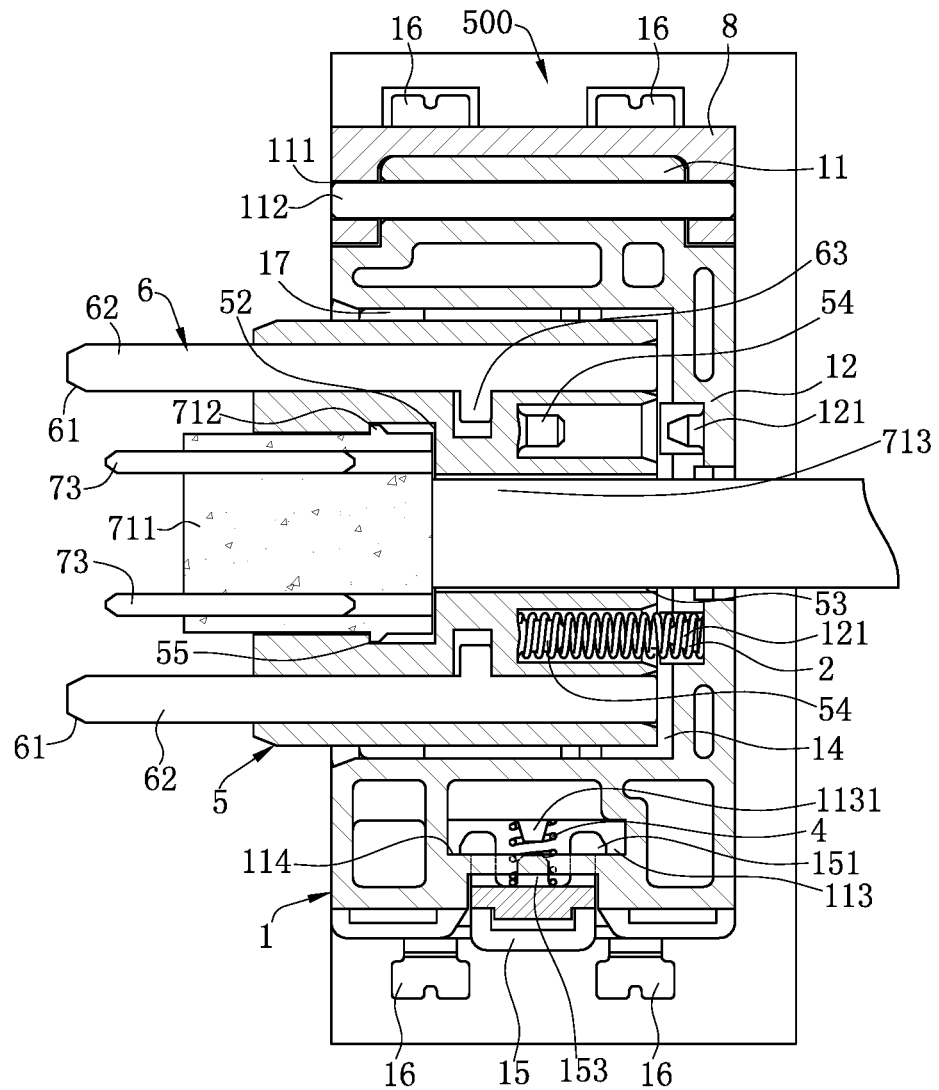
FIG. 5 is a sectional view along an A-A line in FIG. 4.

Referring to FIG. 2, FIG. 3 and FIG. 5, one side of the fixing seat 1 is provided with a through hole 111 runs therethrough along the front-rear direction, and the other side of the fixing seat 1 is provided with a latch member 15. A pivot 112 is fixedly inserted into the through hole 111 and has two ends protruding out of the through hole 111. Two pivoting holes 81 are formed at one side of a cover plate 8 and are pivotally connected to two ends of the pivot 112, and a buckling portion 82 is provided on the other side of the cover plate 8 and latched with the latch member 15. The cover plate 8 is pivotally connected to the fixing seat 1, and is capable of covering and uncovering the base 401. When the buckling portion 82 is latched with the latch member 15, the cover plate 8 covers the optical fiber connector 7, which fixes the optical fiber connector 7 and avoids damage to the optical fiber connector 7. When the optical fiber connector 7 needs to be replaced, it is only necessary to open the cover plate 8 and then take out the optical fiber connector 7, such that the replacement is convenient, and the operation is simple. The fixing seat 1 is provided with at least one third protruding post 131 protruding in the accommodating space 14 along the vertical direction. One end of the second elastic member 3 is sleeved over the third protruding post 131, and the other end of the second elastic member 3 abuts a bottom surface of the sliding seat 5. The other side of the fixing seat 1 is concavely provided with a slot 113. A stopping portion 114 is protrudingly provided in the slot 113, and the stopping portion 114 is extending along the front-rear direction. The latch member 15 is movably mounted in the slot 113 and is floatable along the left-right direction. One side of the latch member 15 is provided with two hook portions 151 provided at an interval and entering the slot 113. The two hook portions 151 are respectively located between an inner wall surface of the slot 113 and the stopping portion 114, the stopping portion 114 is located at an outer side of the two hook portions 151 and the stopping portion 114 is used for stopping each hook portion 151, thus ensuring that the hook portion 151 has a moving gap in the slot 113, and preventing the hook portion 151 from being separated from the slot 113. The other side of the latch member 15 is protrudingly provided with a latch block 152 toward a direction away from the hook portions 151 and matching with the buckling portion 82. The latch member 15 is protrudingly provided with a first protruding portion 153 located between the two hook portions 151, and the inner wall surface of the slot 113 is integrally and protrudingly provided with a second protruding portion 1131 opposite to the first protruding portion 153. One end of a spring 4 is sleeved over the first protruding portion 153, and the other end of the spring 4 is sleeved over the second protruding portion 1131. When the cover plate 8 covers the fixing seat 1, the latch member 15 compresses the spring 4 and moves into the slot 113, such that the latch block 152 is buckled to the buckling portion 82. In the embodiment, the buckling portion 82 is a through groove. The spring 4 is provided to enable the cover plate 8 to be elastically fastened to the fixing seat 1, and to prevent the buckling portion 82 from being broken. The fixing seat 1 is mounted on a first circuit board 500, and the fixing seat 1 is concavely provided with multiple retaining slots 115. One end of each of multiple metal members 16 is retained in the retaining slots 115, and the other end of each metal member 1 is soldered to the circuit board 500. In this embodiment, the first elastic member 2, the second elastic member 3 and the spring 4 are linear springs, without being limited thereto.

Referring to FIG. 2, FIG. 3 and FIG. 5, a first accommodating groove 51 and a second accommodating groove 53 are concavely provided in sequence backward from a front end surface of the sliding seat 5 and are intercommunicated with each other. A width of the second accommodating groove 53 is less than a width of the first accommodating groove 51, and a step surface 52 is provided between the first accommodating groove 51 and the second accommodating groove 53. The optical fiber connector 7 includes an insulating seat 71 having a mating section 711 and a connecting section 713 connected to a rear end of the mating section 711. A width of the connecting section 713 is less than a width of the mating section 711. Multiple optical fibers 72 are received in the mating section 711 and a front end of each of the optical fibers 72 is exposed on a front end of the mating section 711. The optical fibers 72 is extend to the connecting section 713 to form an optical fiber cable. The mating section 711 is fixed in the first accommodating groove 51, and the connecting section 713 is partially accommodated in the second accommodating groove 53. That is, the sliding seat 5 supports and limits the positions of the mating section 711 and the connecting section 713 simultaneously, thus effectively avoiding a joint between the connecting section 713 and the mating section 711 from being easily broken, and improving the structural stability of the optical fiber connector 7. The step surface 52 is located at the rear end of the mating section 711 to stop the mating section 711 from moving backward. Each of two sides of the insulating seat 71 is protrudingly provided with a position limiting block 712 along the left-right direction, and each of left and right sides of the first accommodating groove 51 is provided with a stopping surface 55 correspondingly located in front of the position limiting block 712 for stopping the position limiting block 712 from moving forward, thereby ensuring the optical fiber connector 7 to have an appropriate floating gap in the front-rear direction, and preventing the optical fiber connector 7 from collision. Moreover, the step surface 52 is located behind the mating section 711 to stop the mating section 711 from moving backward, such that the optical fiber connector 7 and the mating optical fiber connector 403 are in good contact, ensuring transmission of the optical signals, and preventing the optical fiber connector 7 from being separated from the sliding seat 5.

Referring to FIG. 2, FIG. 3 and FIG. 5, the sliding seat 5 is protrudingly provided with a second guide mechanism 6 along the front-rear direction. The second guide mechanism 6 includes a third guide section 61 located at a front end of the second guide mechanism 6 and a fourth guide section 62 extending backward from the third guide section 61. In the embodiment, the second guide mechanism 6 is a post. The second guide mechanism 6 is assembled to the sliding seat 5. An outer surface of the second guide mechanism 6 is protrudingly provided with a fixing block 63 fastened in a groove of the sliding seat 5, such that the second guide mechanism 6 is floatable with the sliding seat 5. The optical fiber connector 7 is floatable with the sliding seat 5, thus facilitating the position adjustment of the second guide mechanism 6, enabling the second guide mechanism 6 to be more accurately inserted into the mating optical fiber connector 403, facilitating positioning alignment, and achieving a better guide effect. The third guide section 61 is provided with chamfers at two sides along the left-right direction, such that the third guide section 61 has a width gradually becoming wide from front to rear, and the fourth guide section 62 has an equal width at all locations. In this embodiment, a left side and a right side of the sliding seat 5 are respectively provided with two second guide mechanisms 6, and a left side and a right side of the insulating seat 71 are respectively provided with two guide portions 73. In this embodiment, each guide portion 73 is a cylinder. Each guide portion 73 is assembled to the insulating seat 71, and a front end of each guide portion 73 is located behind the third guide section 61.

Figure 6:
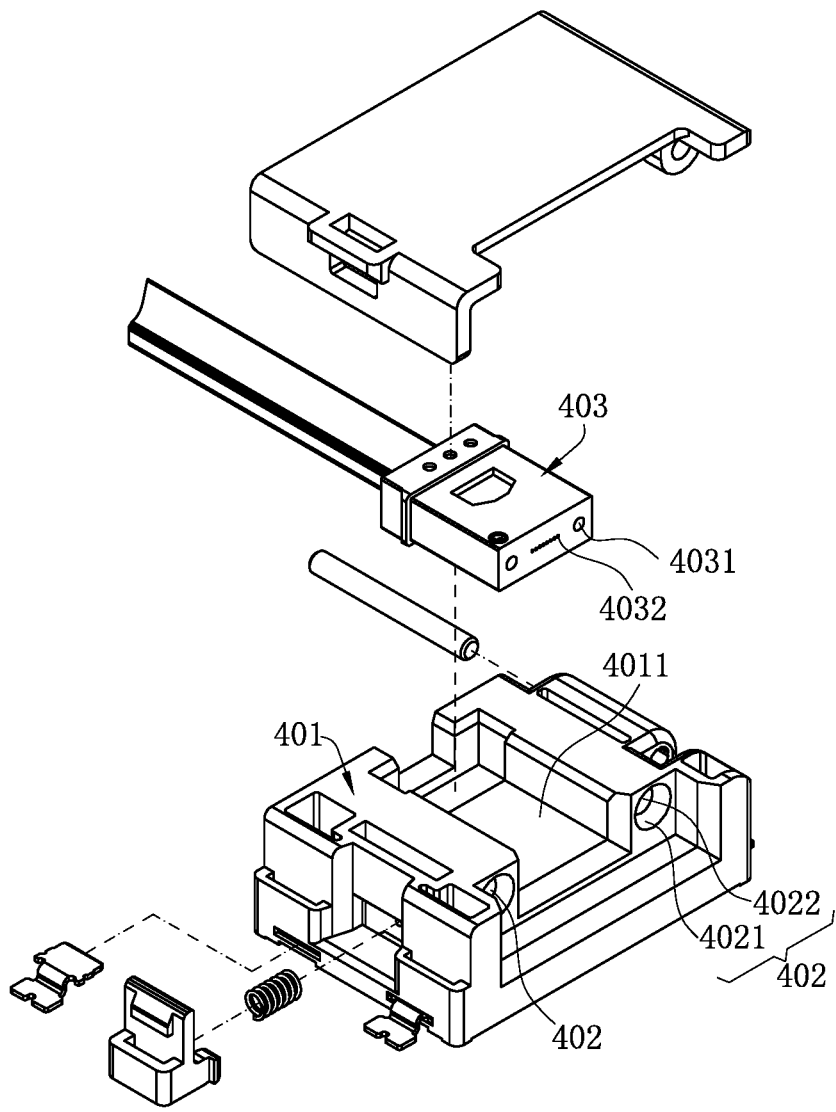
FIG. 6 is a perspective exploded view of a mating optical fiber connector assembly according to certain embodiments of the present invention.
Figure 7:
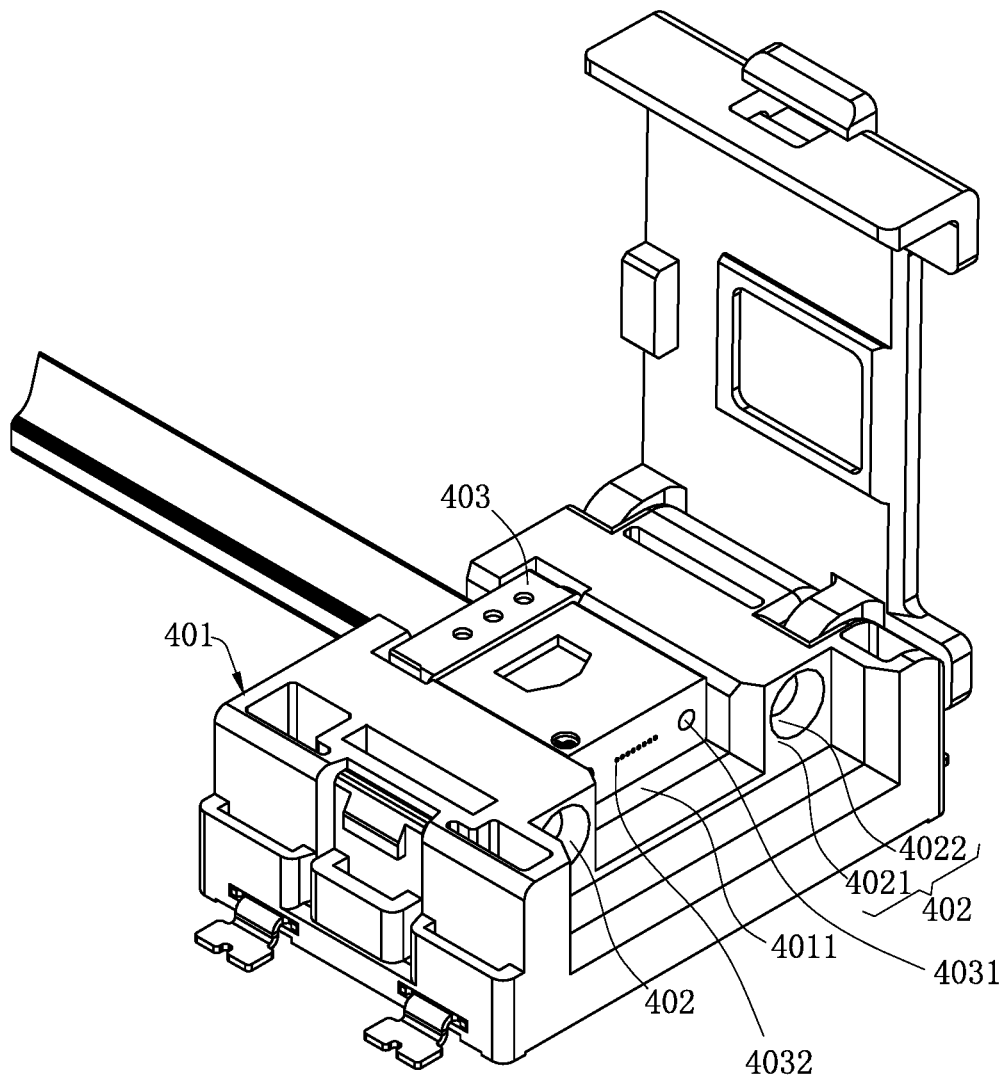
FIG. 7 is an assembled view of a mating optical fiber connector assembly according to certain embodiments of the present invention.
Figure 8:
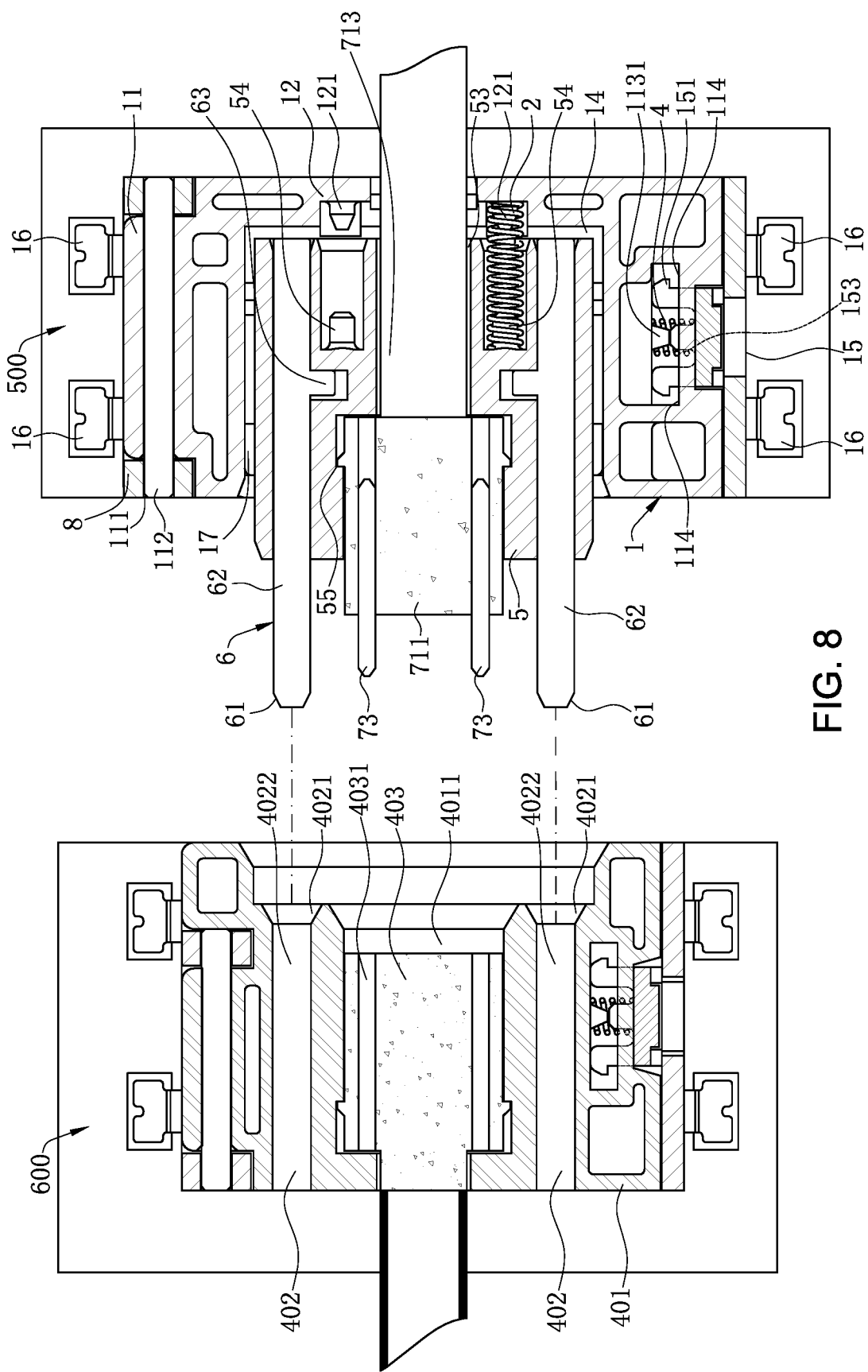
FIG. 8 is a sectional view of an optical fiber connector assembly and a mating optical fiber connector assembly not mated with each other according to certain embodiments of the present invention.

Referring to FIG. 6, FIG. 7 and FIG. 8, the mating optical fiber connector assembly 400 includes the base 401 fixedly mounted on the second circuit board 600. The mating optical fiber connector 403 is fixedly mounted on the base 401. A top surface of the base 401 is downward concavely provided with an accommodation space 4011 for accommodating the mating optical fiber connector 403. The structure of the base 401 is substantially identical to the structure of the fixing seat 1. The base 401 is also provided with the multiple metal members 16 for soldering the base 401 to the second circuit board 600. One side of the base 401 is pivotally connected to the cover plate 8 for covering the mating optical fiber connector 403. The mating optical fiber connector 403 and the optical fiber connector 7 have identical structures, which will not be hereinafter elaborated. The left side and the right side of the mating optical fiber connector 403 are respectively concavely provided with the two adaptation portions 4031 to correspondingly match with the two guide portions 73. The mating optical fiber connector 403 has multiple mating optical fibers 4032 for mating with the optical fiber 72. The base 401 is provided with a second matching area 402. The second matching area 402 includes a third matching section 4021 and a fourth matching section 4022 extending backward from the third matching section 4021. The third matching section 4021 has a width gradually becoming narrow from front to rear, and a width of the fourth matching section 4022 is less than or equal to a minimum width of the first matching section 3021. In the embodiment, the width of the fourth matching section 4022 is equal to the minimum width of the third matching section 4021. In other embodiments, the third matching section 4021 has an equal width at all locations. That is, the third matching section 4021 is not provided with chamfers as long as it is ensured that the third guide section 61 and the fourth guide section 62 can be inserted into the third matching section 4021.

Figure 10:
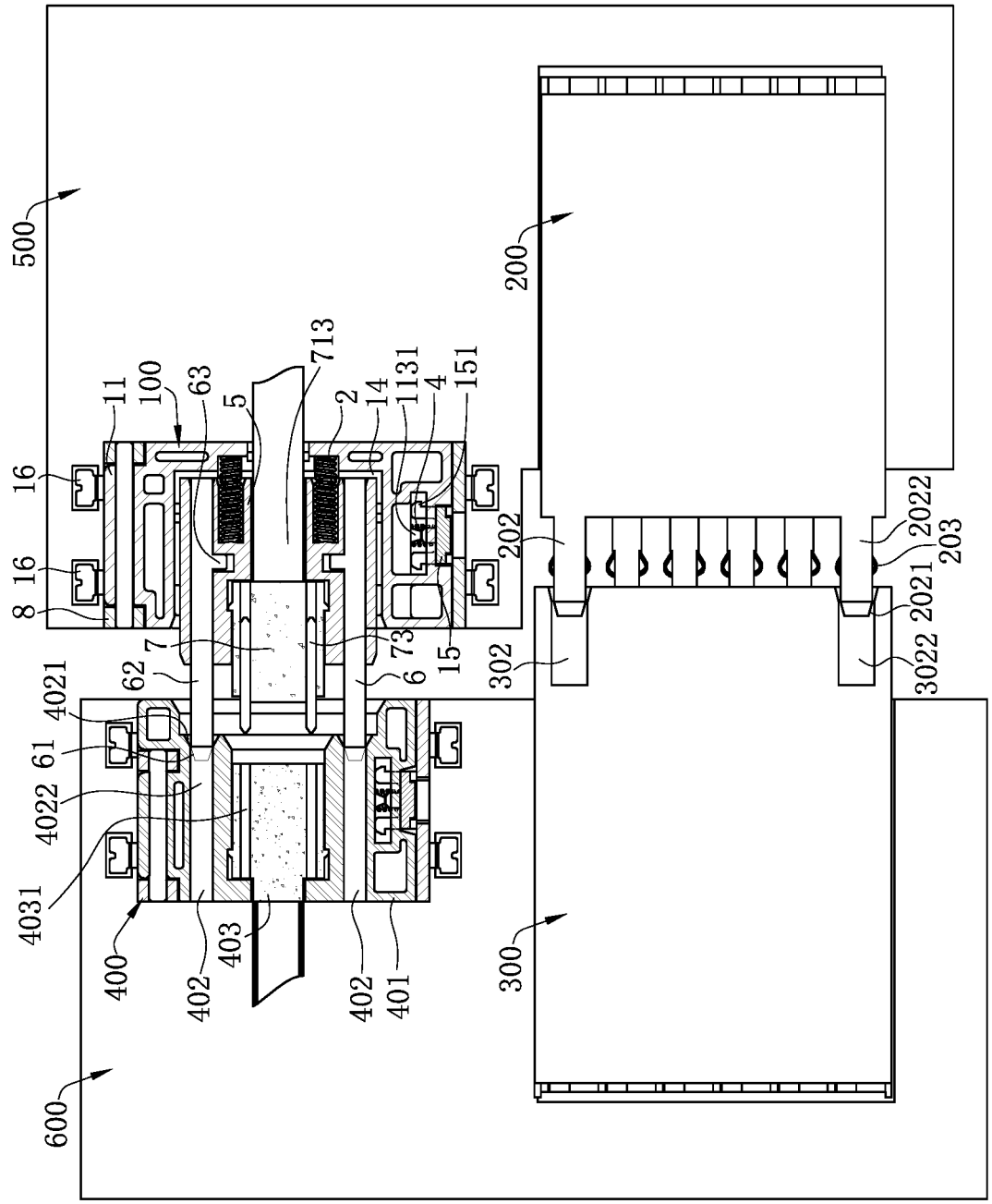
FIG. 10 is a schematic view of the electrical connector and the optical fiber connector assembly in FIG. 9 respectively mated with a mating electrical connector and a mating optical fiber connector assembly simultaneously.

Referring to FIG. 1, FIG. 10 and FIG. 12, the electrical connector 200 is fixedly mounted on the first circuit board 500. The electrical connector 200 includes a plastic main body 201 and multiple conductive terminals 203 accommodated in the plastic main body 201. The conductive terminals 203 are all soldered to the first circuit board 500, so as to be electrically connnected with the first circuit board 500. The electrical connector 200 is protrudingly provided with a first guide mechanism 202 along the front-rear direction, and the first guide mechanism 202 includes a first guide section 2021 at a front end of the first guide mechanism 202 and a second guide section 2022 extending backward from the first guide section 2021. In this embodiment, the first guide mechanism 202 integrally protrudes forward from a front end surface of the plastic main body 201, and the first guide mechanism 202 is a square column. In the embodiment, the first guide mechanism 202 and the plastic main body 201 are integrally molded. In other embodiments, the first guide mechanism 202 may be independently provided and then assembled to the plastic main body 201. The first guide mechanism 202 has the first guide section 2021 and the second guide section 2022 connected along the front-rear direction. The first guide section 2021 is provided with chamfers at both sides along the left-right direction, such that the first guide section 2021 has the width gradually becoming wide from front to rear, and the second guide section 2022 has an equal width at all locations.

Referring to FIG. 1, FIG. 9 and FIG. 12, the second circuit board 600 and the first circuit board 500 are provided opposite and in parallel to each other. In the embodiment, the second circuit board 600 and the first circuit board 500 are located on a same horizontal plane. The mating electrical connector 300 is fixedly mounted on the second circuit board 600. The optical fiber connector assembly 100 is provided with an guide portion 73 along the front-rear direction. The second circuit board 600 and the first circuit board 500 are provided opposite to each other. The mating electrical connector 300 and the mating optical fiber connector assembly 400 are provided on the second circuit board 600 side by side. The mating electrical connector 300 is provided with a first matching area 302 corresponding to the first guide mechanism 202, and the first matching area 302 includes a first matching section 3021 and a second matching section 3022 extending backward from the first matching section 3021. The mating electrical connector 300 includes an insulating main body 301 and multiple mating terminals 303 accommodated in the insulating main body 301. One end of each of the mating terminals 303 is electrically connnected to the corresponding one of the conductive terminals 203, and the other ends of the mating terminals 303 are all soldered to the second circuit board 600, so as to be electrically connnected with the second circuit board 600. The first matching area 302 is backward concavely provided on a front end surface of the insulating main body 301 and matches with the first guide mechanism 202. The first matching area 302 has the first matching section 3021 and the second matching section 3022 in communication with the first matching section 3021. The first matching section 3021 has a width gradually becoming narrow from front to rear. That is, the first matching section 3021 is also provided with chamfers, and a width of the second matching section 3022 is less than or equal to a minimum width of the first matching section 3021, so as to facilitate the insertion of the first guide section 2021. In the embodiment, the width of the second matching section 3022 is equal to the minimum width of the first matching section 3021. In other embodiments, the first matching section 3021 has an equal width at all locations. That is, the first matching section 3021 is not provided with chamfers as long as it is ensured that the first guide section 2021 and the second guide section 2022 can be inserted into the matching section 3021.

Figure 11:
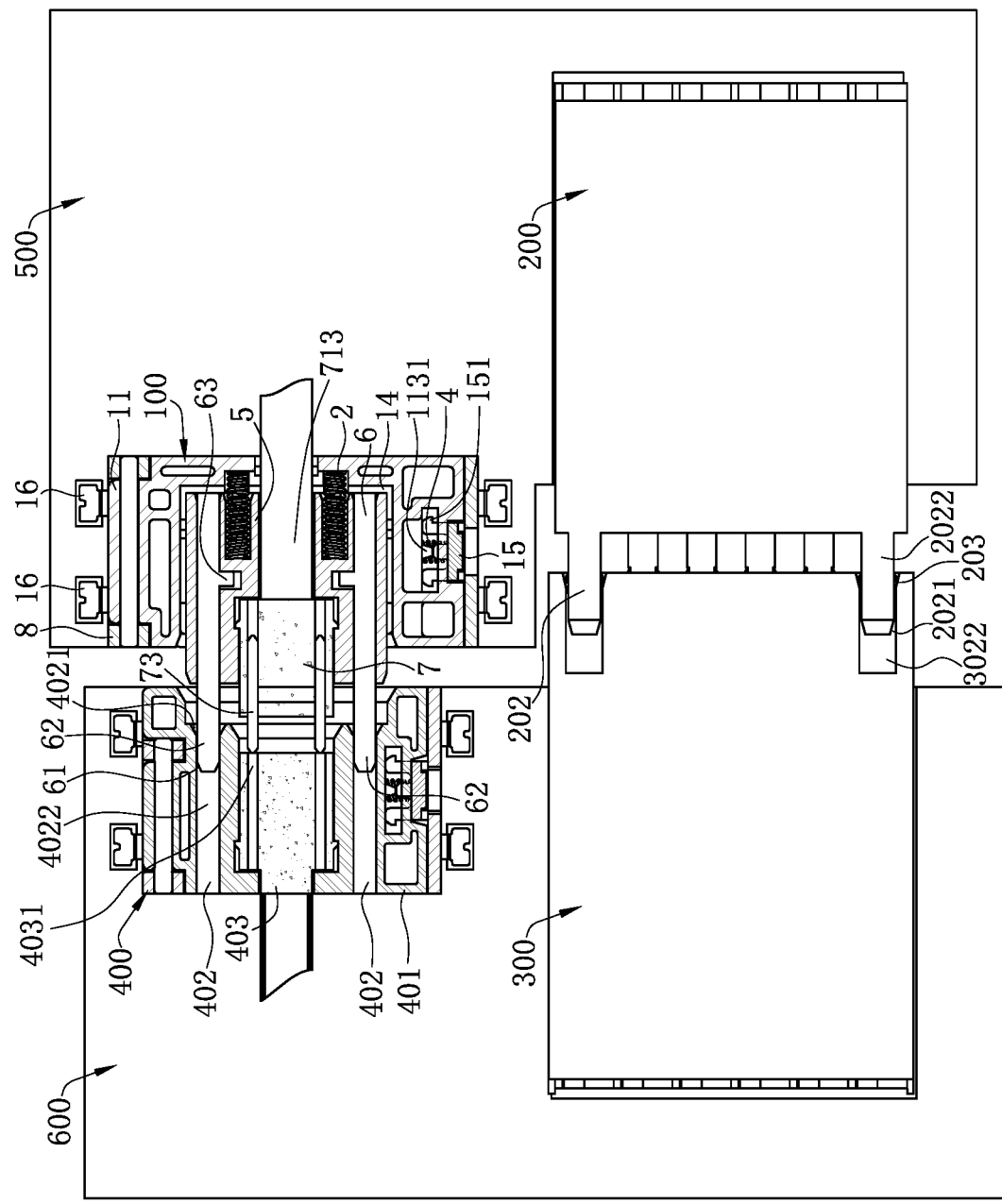
FIG. 11 is a schematic view of a mating starting state of the optical fiber connector assembly and the mating optical fiber connector in FIG. 9.

Referring to FIG. 9, FIG. 10 and FIG. 11, when the electrical connector 200 and the mating electrical connector 300 start mating with each other, the optical fiber connector assembly 100 and the mating optical fiber connector assembly 400 also start mating. That is, the electrical connector 200 and the optical fiber connector assembly 100 are respectively mated with the mating electrical connector 300 and the mating optical fiber connector assembly 400 correspondingly and simultaneously. When mating starts, the first guide mechanism 202 is aligned with the first matching area 302, and the second guide mechanism 6 is aligned with the second matching area 402. The first guide mechanism 202 and the second guide mechanism 6 are large in size, thus facilitating alignment. Then, the first guide section 2021 of the first guide mechanism 202 enters the first matching section 3021, and the third guide section 61 of the second guide mechanism 6 also enters the third matching section 4021. As shown in FIG. 10, the first guide section 2021 penetrates through the first matching section 3021 and enters the second matching section 3022, and the third guide section 61 penetrates through the third matching section 4021 and enters the fourth matching section 4022. As shown in FIG. 11, each guide portion 73 starts entering the corresponding adaptation portion 4031. As shown in FIG. 12, when the guide portion 73 completely enters the corresponding adaptation portion 4031, the optical fiber 72 and the mating optical fiber 4032 are mated, and the optical fiber connector 7 and the mating optical fiber connector 403 are completely mated. Further, the conductive terminal 203 and the mating terminal 303 are mated, and the electrical connector 200 and the mating electrical connector 300 are also completely mated. The first guide mechanism 202 matches with the first matching area 302, the second guide mechanism 6 is added to the optical fiber connector assembly 100, the second matching area 402 is correspondingly added to the mating optical fiber connector assembly 400, and the second guide mechanism 6 matches with the second matching area 402, thereby enhancing the strength of guiding the guide portion 73 of the optical fiber connector assembly 100 to align the adaptation portion 4031 of the mating optical fiber connector assembly 400, and allowing the guide portion 73 to be accurately inserted. Further, the optical fiber connector 7 and the mating optical fiber connector 403 can be more accurately aligned by guidance for three times, a transmission rate of a signal is better, the guide portion 73 is prevented from collision or even being broken by imperfect insertion, thereby preventing the optical fiber connector assembly 100 from being damaged, ensuring good mating between the optical fiber 72 and the mating optical fiber 4032, and achieving a better signal transmission effect. In the embodiment, the optical fiber connector assembly 100 is provided with the second guide mechanism 6, and the mating optical fiber connector assembly 400 is provided with the second matching area 402. In other embodiments, the optical fiber connector assembly 100 may not be provided with the second guide mechanism 6, and the mating optical fiber connector assembly 400 may not be provided with the second matching area 402. By using only the first guide mechanism 202 provided on the electrical connector 200 for guidance, the effects of avoiding damage to the optical fiber connector assembly 100 and ensuring good mating between the optical fiber connector 7 and the mating optical fiber connector 403 can also be achieved.

To sum up, the optical fiber connector assembly and the connecting system according to certain embodiments of the present invention have the following beneficial effects:

(1) When the optical fiber connector 7 is mated with the mating optical fiber connector 403, the optical fiber connector 7 has an appropriate floating gaps in all directions, preventing the optical fiber connector 7 from collision. The mating section 711 is located in the first accommodating groove 51, and the connecting section 713 is partially accommodated in the second accommodating groove 53. That is, the sliding seat 5 supports and limits the positions of the mating section 711 and the connecting section 713 simultaneously, thus effectively avoiding a joint between the connecting section 713 and the mating section 711 from being easily broken, and improving the structural stability of the optical fiber connector 7. Moreover, the step surface 52 is located behind the mating section 711 to stop the mating section 711 from moving backward, such that the optical fiber connector 7 and the mating optical fiber connector 403 are in good contact, ensuring transmission of the optical signals, and preventing the optical fiber connector 7 from being separated from the sliding seat 5.

(2) The optical fiber connector assembly 100 is provided with the second guide mechanism 6, and the mating optical fiber connector assembly 400 is correspondingly provided with the second matching area 402, thereby further enhancing the strength of guiding the guide portion 73 of the optical fiber connector assembly 100 to align the adaptation portion 4031 of the mating optical fiber connector assembly 400, and allowing the guide portion 73 to be accurately inserted.

(3) The first guide mechanism 202 matches with the first matching area 302 to guide the guide portion 73 of the optical fiber connector assembly 100 to align the adaptation portion 4031 of the mating optical fiber connector assembly 400, and accurate insertion can be achieved, such that the guide portion 73 is prevented from collision or even being broken by imperfect insertion, thereby preventing the optical fiber connector assembly 100 from being damaged, ensuring good mating between the optical fiber 72 and the mating optical fiber 4032, and achieving a better signal transmission effect.

(4) The optical fiber connector 7 is floatable with the sliding seat 5, thus facilitating the position adjustment of the second guide mechanism 6, enabling the second guide mechanism 6 to be more accurately inserted into the mating optical fiber connector 403, facilitating positioning alignment, and achieving a better guide effect.

(5) The front end of the sliding seat 5 is located above the supporting member 17, and the sliding seat 5 is supported upward by the supporting member 17, so as to avoid the front end of the sliding seat 5 from sinking and affecting the flatness of the sliding seat 5, and thereby affecting the mating effect of the optical fiber connector 7.

(6) When the buckling portion 82 is latched with the latch member 15, the cover plate 8 covers the optical fiber connector 7, which fixes the optical fiber connector 7 and avoids damage to the optical fiber connector 7. When the optical fiber connector 7 needs to be replaced, it is only necessary to open the cover plate 8 and then take out the optical fiber connector 7, such that the replacement is convenient, and the operation is simple.

(7) The stopping portion 114 is used for stopping each hook portion 151, thus ensuring that the hook portion 151 has a moving gap in the slot 113, and preventing the hook portion 151 from being separated from the slot 113.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical fiber connector assembly, comprising:
   a fixing seat;
   a sliding seat, movably mounted on the fixing seat, wherein a first accommodating groove and a second accommodating groove are concavely provided in sequence backward from a front end surface of the sliding seat and are intercommunicated with each other, a width of the second accommodating groove is less than a width of the first accommodating groove, and a step surface is provided between the first accommodating groove and the second accommodating groove; and
   an optical fiber connector, mounted on the sliding seat and floatable with respect to the fixing seat along a front-rear direction, a left-right direction and a vertical direction, the optical fiber connector comprising an insulating seat having a mating section and a connecting section connected to a rear end of the mating section, and a plurality of optical fibers being received in the mating section and extending to the connecting section, a front end of each of the optical fibers being exposed on a front end of the mating section, wherein the mating section is located in the first accommodating groove, the connecting section is partially accommodated in the second accommodating groove, and the step surface is located behind the mating section to stop the mating section from moving backward.

2. The optical fiber connector assembly according to claim 1, wherein gaps exist between the sliding seat and the fixing seat in the front-rear direction, the left-right direction and the vertical direction, such that the sliding seat is floatable with respect to the fixing seat, and the optical fiber connector is fixedly mounted on the sliding seat.

3. The optical fiber connector assembly according to claim 1, wherein the fixing seat is provided with at least one first elastic member and at least one second elastic member, the first elastic member elastically abuts the sliding seat along the front-rear direction, and the second elastic member elastically abuts the sliding seat along the vertical direction.

4. The optical fiber connector assembly according to claim 3, wherein the fixing seat are provided with two side walls respectively at a left side and a right side of the fixing seat, and a rear stop wall connecting the two side walls, the two side walls and the rear stop wall jointly define an accommodating space configured to accommodate the sliding seat, the rear stop wall is provided with at least one first protruding post protruding forward, the sliding seat is provided with a second protruding post protruding backward and opposite to the first protruding post, one end of the first elastic member is fixed to the first protruding post, and the other end of the first elastic member is fixed to the second protruding post.

5. The optical fiber connector assembly according to claim 4, wherein a front end of the fixing seat is further provided with a U-shaped groove concavely provided downward on an inner wall surface of the accommodating space, a supporting member is fixedly mounted in the U-shaped groove, the sliding seat is partially located above the supporting member, and the supporting member supports the sliding seat upward.

6. The optical fiber connector assembly according to claim 4, wherein the fixing seat is provided with at least one third protruding post protruding in the accommodating space along the vertical direction, one end of the second elastic member is sleeved over the third protruding post, and the other end of the second elastic member abuts a bottom surface of the sliding seat.

7. The optical fiber connector assembly according to claim 1, wherein a left side and a right side of the sliding seat are respectively provided with two posts, a left side and a right side of the insulating seat are respectively provided with two guide portions, and a front end of each of the posts is located behind a front end of a corresponding one of the guide portions.

8. The optical fiber connector assembly according to claim 1, wherein one side of the fixing seat is provided with a through hole running therethrough along the front-rear direction, the other side of the fixing seat is provided with a latch member, a pivot is fixedly provided and inserted in the through hole and has two ends protruding out of the through hole, one side of a cover plate is provided with two pivoting holes pivotally connected to the two ends of the pivot, and the other side of the cover plate is provided with a buckling portion latched with the latch member.

9. The optical fiber connector assembly according to claim 8, wherein the other side of the fixing seat is concavely provided with a slot, the slot is protrudingly provided with a stopping portion, the latch member is movably mounted in the slot, one side of the latch member is provided with a hook portion entering the slot, the stopping portion is located at an outer side of the hook portion to prevent the hook portion from being separated from the slot, and the other side of the latch member is protrudingly provided with a latch block toward a direction away from the hook portion and latched with the buckling portion.

10. The optical fiber connector assembly according to claim 9, wherein one side of the latch member is protrudingly provided with a first protruding portion, the inner wall surface of the slot is integrally and protrudingly provided with a second protruding portion opposite to the first protruding portion, one end of a spring is sleeved over the first protruding portion, the other end of the spring is sleeved over the second protruding portion, and when the cover plate covers the fixing seat, the latch member compresses the spring and moves into the slot, such that the latch block is buckled to the buckling portion.

11. The optical fiber connector assembly according to claim 1, wherein the fixing seat is mounted on a first circuit board, the fixing seat is concavely provided with at least one retaining groove, one end of at least one metal member is retained in the retaining groove, and the other end of the at least one metal member is soldered to the first circuit board.

12. The optical fiber connector assembly according to claim 1, wherein each of two sides of the mating section is protrudingly provided with a position limiting block along the left-right direction, and each of left and right sides of the first accommodating groove is provided with a stopping surface correspondingly located in front of the position limiting block and configured to stop the position limiting block from moving forward.

13. The optical fiber connector assembly according to claim 1, wherein a width of the connecting section along the left-right direction is less than a width of the mating section along the left-right direction, and a length of the connecting section along the front-rear direction is greater than a length of the mating section along the front-rear direction.

\* \* \* \* \*